United States Patent [19]

Slagel

[11] 4,034,775

[45] July 12, 1977

[54] SEQUENCING VALVE

[76] Inventor: Roger D. Slagel, 641 NW. 74th Ave., Plantation, Fla. 33317

[21] Appl. No.: 684,854

[22] Filed: May 10, 1976

[51] Int. Cl.² .................................... F16K 21/00
[52] U.S. Cl. .......................... 137/119; 137/624.18; 137/408
[58] Field of Search ............. 137/119, 624.18, 408

[56] References Cited

U.S. PATENT DOCUMENTS

| | | | |
|---|---|---|---|
| 2,766,070 | 10/1956 | Park | 137/408 X |
| 3,369,565 | 2/1968 | Haggard, Jr. | 137/624.18 X |
| 3,924,652 | 12/1975 | Kah, Jr. | 137/624.18 X |

*Primary Examiner*—William R. Cline

[57] ABSTRACT

The present invention relates to an improved sequencing disk means for fluid handling in a sequencing valve having a plurality of outlets. Sequencing valves deliver fluid from the inlet sequentially out through one or more fluid outlets in a predetermined sequencing cycle. The sequencing disk means reciprocates and rotates to sequentially deliver fluid under both high or low fluid flow rates from an inlet to a plurality of discharge outlets. The improved sequencing disk means includes a main sealing means, a stem connected to the main sealing means, and a generally cup-shaped check valve means with a relatively small opening in the bottom of the cup-shaped portion. The stem and check valve means includes connecting means that cooperate to fix the stem relative to the main sealing means or sequencing disk.

7 Claims, 8 Drawing Figures

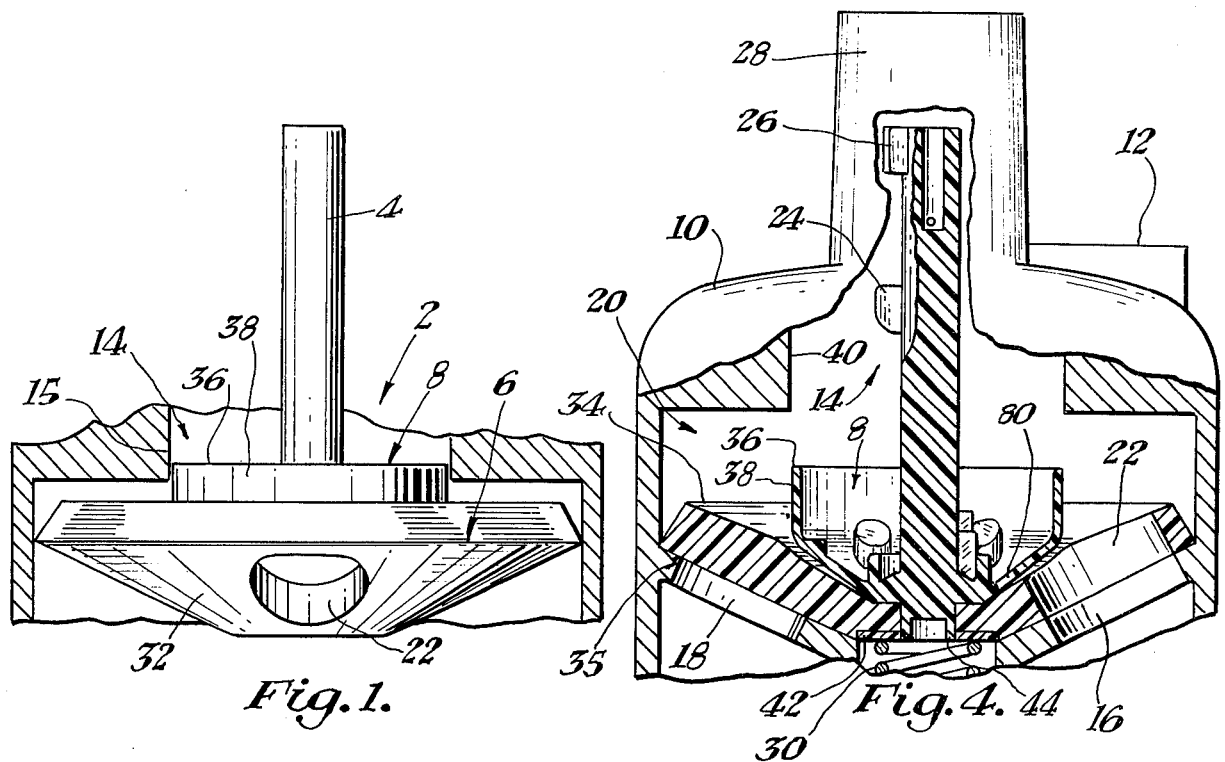
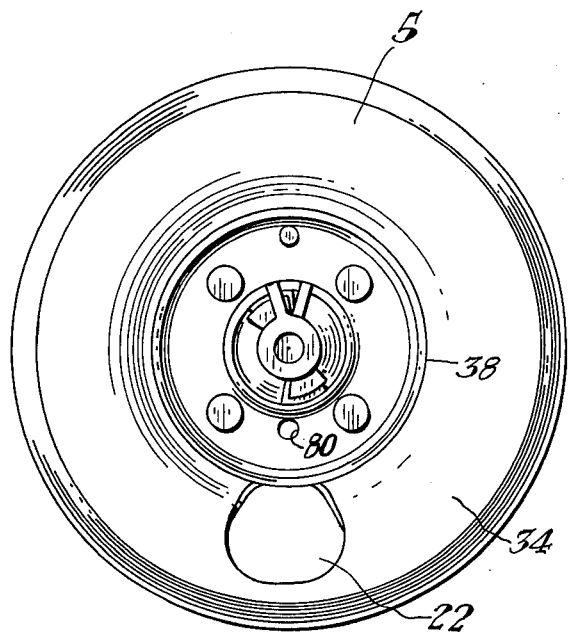
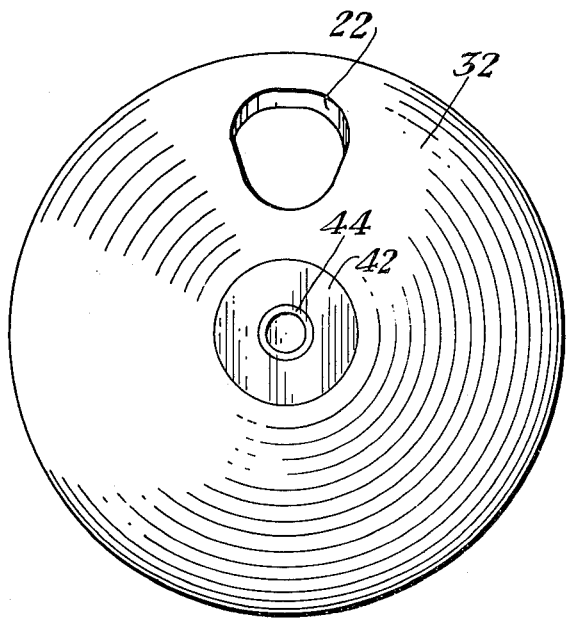

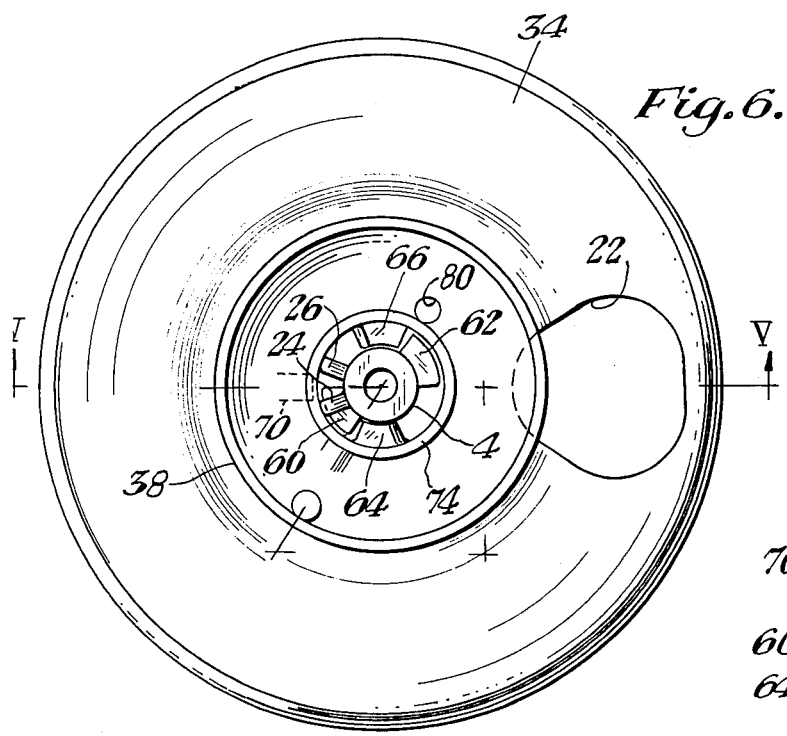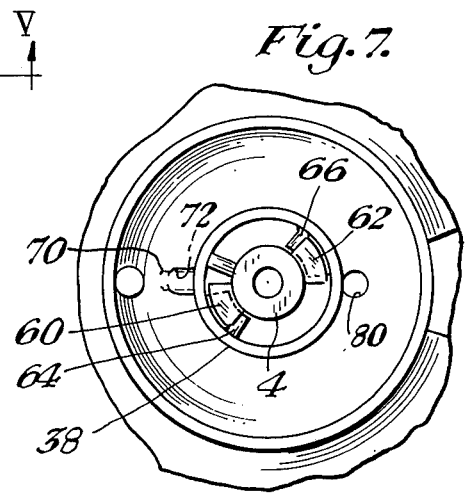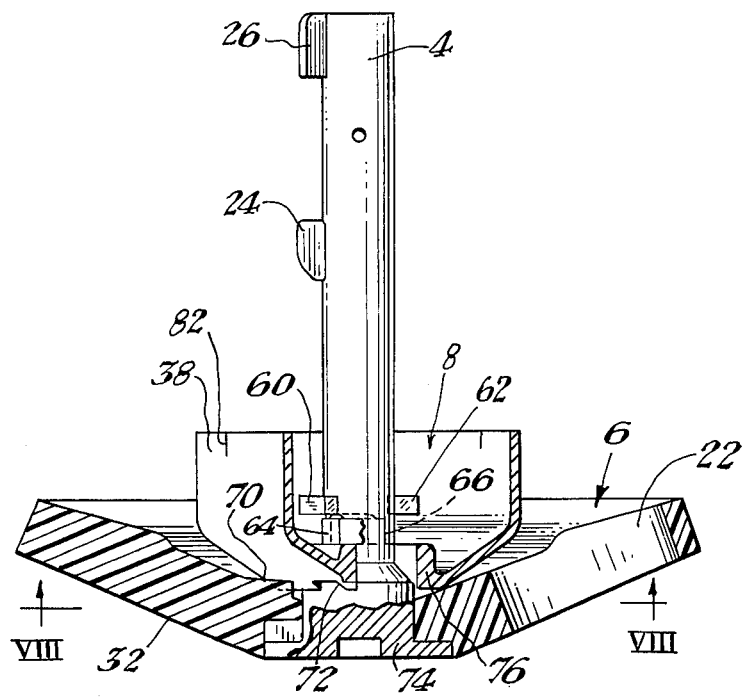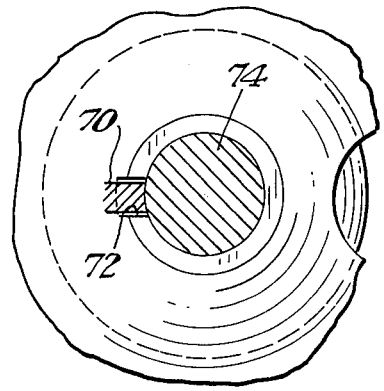

SEQUENCING VALVE

BACKGROUND OF THE INVENTION

This invention relates to a new and improved sequencing disk with a generally cup-shaped means thereon for improving movement of the sequencing disk, fix the stem relative to the sequencing disk, and to filter the incoming fluid and providing a check valve function.

In the past many problems have been encountered in providing functionally operable sequencing valve sealing means at both low and high fluid flow rates. The E. Haggard U.S. Pat. No. 3,369,565 discloses a sequencing valve having an integrally mounted check valve. It will be obvious to those skilled in the art that the sequencing valve of U.S. Pat. No. 3,369,565 can operate in response to supply fluid delivered through the valve inlet and distributed out of a plurality of outlets. The main sealing means reciprocates and rotates during its cyclic operation in a well known manner. The Miller U.S. Pat. No. 3,785,391 shows a resilient variable flow check valve in a sequencing valve. A variable flow device is shown by the C. Kah, Jr., et al, U.S. Pat. No. 3,524,470 incorporating a flap valve in the valve member.

Thus, previously designed fluid flow operated sequencing valves required a significant amount of fluid flow through the valve to properly operate the sequencing valve. Obviously, if a high fluid flow rate is to pass through the valve, the valve design is not complex. When a large check port area is used in the sequencing valve to accomodate large fluid flow rates, it becomes difficult to sequence the disk by use of the check valve when only a low fluid flow rate passes through the valve. The large outer perimeter of the check valve element immediately creates a large opening area with very small downward movement of the check valve. A large fluid flow rate is therefore required to move the check valve element and disk downwardly any substantial distance to achieve complete cycling. This has also been found true in variable flow check devices such as in the Miller U.S. Pat. No. 3,785,391. Accordingly, prior art fluid flow operated sequencing valves with check valve means have been limited to a rather small range of fluid flow rates.

BRIEF DESCRIPTION OF THE INVENTION

This is a new and improved sequencing disk means for a sequencing valve. The sequencing disk means includes a stem and a main sealing means or sequencing disk connected to the stem. The main sealing means or sequencing disk has at least one opening therein for directing the outward flow of fluid in the valve through one or more of a plurality of exit ports. The improved sequencing disk means also includes a generally cup-shaped check valve means connected adjacent the inlet. The generally cup-shaped check valve means provides the sequencing disk with a means of collecting incoming water to drive the disk downwardly during its sequencing operation. The weight of the water is not dependent on the fluid flow rate. The check valve means has a fluid control exit means therein, a hole, for draining the check valve means of water when the flow of fluid stops entering into the sequencing valve through the inlet. The size of the fluid control exit means controls the minimum fluid flow rate for operating the improved sequencing disk means. The generally cup-shaped check valve means provides filtering means for large objects in the incoming fluid to prevent foreign objects from moving between the lower sealing surface of the main sealing means or sequencing disk and the upper sealing area of the inner surface of the valve housing around the exit ports. The filtering action insures proper operation of the valve. The generally cup-shaped check valve means or check valve device allows the sequencing disk means to move downwardly when large fluid flow rates as well as small fluid flow rates enter the housing inlet.

The generally cup-shaped check valve means includes a generally cup-shaped portion and caming means. The cup-shaped portion may be designed in two or more heights to cover extremely small or extremely large fluid flow rates. The cup-shaped portion may include a resilient upper edge not illustrated, with or without short vertical slits, the slits allow sideways movement of the upper lip to enlarge the exit area around the upper lip or perimeter of the check valve device. The upper lip or perimeter is moved to enlarge the exit area of the internal inlet bore to provide a variable internal inlet exit area. Thereby a greater fluid flow rate may pass through the check valve bore after the main sealing means is moved into its lowermost position.

The stem and check valve means include mating cam means to provide connecting means to fix the position of the stem and the main sealing means.

An object of this invention is to provide an improved sequencing disk means that operates during either low or high fluid rates by providing a high flow force balancing means and a low flow sequencing means.

Another object of this invention is to provide a stem, disk and check valve means that are interconnected to fixes or locks the stem position relative to the disk.

Another object of this invention is to provide an improved sequencing valve disk means that acts as a check valve, a filter for incoming fluid, and provides a unique device for driving the sequence valve disk downwardly during its operating cycle.

Another object of this invention is to provide a sequencing disk means operated by the weight of water collected in a cup that is controlled by an exit port in the cup.

Another object of this invention is to provide a replaceable fluid flow rate control means in a sequencing valve disk means for installed irrigation systems to allow changes in the operational fluid flow rate range for the system without removing and changing the entire valves.

A further object is to provide a generally cup-shaped check valve means having an upper resilient lip that is moveable to allow additional fluid flow through the valve around the perimeter of the lip of the check valve means.

In accordance with these and other objects which will be apparent hereinafter, the instant invention will now be described with particular reference to the accompanying drawings.

BRIEF DESCRIPTION OF THE DRAWINGS

In the drawings:

FIG. 1 is a side view of the new and improved sequencing disk means illustrated in an upper portion of a sequencing valve housing shown in cross-section with the check valve means in the internal inlet bore and the disk opening between outlets;

FIG. 2 is a top view of the sequencing disk means shown in FIG. 1.

FIG. 3 is a bottom view of the sequencing disk means shown in FIGS. 1 and 2.

FIG. 4 is a cross-sectional side view of a two piece sequencing disk means in its lowermost position in a housing cavity in a cut away illustration of a portion of a housing of a sequencing valve.

FIG. 5 is a side view partially in cross-section of a three part sequencing disk means shown in FIG. 6, taken across lines V—V and looking in the direction of the arrows.

FIG. 6 is a top view of the three part sequencing disk means.

FIG. 7 is a partial top view of the sequencing disk means shown in FIG. 6 with the generally cup-shaped member in a locked position.

FIG. 8 is a partial top view in cross-section of the sequencing disk means in FIG. 5 taken along lines VIII-—VIII and looking in the direction of the arrows.

DESCRIPTION OF THE PREFERRED EMBODIMENT

Referring now to the drawings, and in particular to FIGS. 1, 4 and 5, a new and improved sequencing disk means is generally shown by numeral 2 and includes a generally cup-shaped check valve means 8, a stem 4 and a resilient main sealing means 6 also referred to as a main sequencing disk. The cup-shaped disk valve means provides a force balancing function as well as a low flow sequencing function. The main sequencing disk is connected to the lower end of the stem 4. The cup-shaped check valve means 8 is integral with the stem, see FIG. 4, or connected to the stem, see FIG. 5. The check valve means 8 is positioned adjacent the upper surface 5 of the main sequencing disk or main disk 6. The generally cup-shaped check valve means 8, as shown in FIG. 5, is a separate member that is removeably connected to the stem 4 and the main disk 6 by cam connecting members referred to herebelow. The check valve means 8 as shown in FIG. 4 is part of the stem structure. The check valve means 8 and the main sealing means 6 may be a single molded member.

The cup-shaped member is symmetrical about the center line of the centrally located housing inlet to balance the incoming fluid forces engaging the sequencing valve means 2.

The generally cup-shaped check valve means 8 shown in FIGS. 1 through 8 includes an upper circular edge or perimeter 36. The exterior surface 38 and the perimeter 36 of the cup moves into and out of the check valve bore 14 as shown in FIG. 1. The outer surface 38 of the check valve means 8 moves into contact with the inner surface 15 as shown in FIG. 1 of the check valve bore 14. Surface 15 is shown as surface 40 in FIG. 4. The sequencing disk means 2 is shown in its upper position in FIG. 1 and in its lowermost position in FIG. 4.

The generally cup-shaped check valve means 8 provides the sequencing disk 6 with a means of collecting incoming water to drive the disk downwardly during its sequencing operation. The weight of the water is not solely dependent on the fluid flow rate. The check valve means 8 has a fluid control exit means 80, a hole, for draining the check valve means of water when the flow of fluid stops entering into the sequencing valve through the inlet. Spring 30 will force the sequencing disk means 2 upwards when the check valve means 8 is empty of water. Spring 30 is preferably positioned within stem 4 as shown in the co-pending patent application. The size of the fluid control exit means 80 shown in FIGS. 2, 4, 6 and 7 controls the minimum fluid flow rate for operating the improved sequencing disk means 2.

The cup-shaped member may be designed so that the weight of the water alone, in the cup member will overcome the force of the return spring 30. Preferably the cup member is designed so that the weight of the collected water and the force of the incoming water against the cup member together overcome the force of spring 30.

The generally cup-shaped check valve means 8 provides filtering means for large objects in the incoming fluid to prevent foreign objects from moving between the lower sealing surface 32 of the main sealing means or sequencing disk and the upper sealing area 35, shown in FIG. 4 of the inner surface of the valve housing around the exit ports. The filtering action insures proper operation of the valve. The generally cup-shaped check valve means or check valve device 6 allows the sequencing disk means 2 to move downwardly when large fluid flow rates as well as small fluid flow rates enter the housing inlet to fill the cup.

The exit 80 is preferably locked into a position over opening 22 to provide a faster drain means for the sequencing disk or valve means to speed up completion of a full cycle. When exit 80 is so positioned, the back flow through opening 22 will aid in flushing exit 80 and also allow movement of the resilient main sealing means 6 toward exit 80 to seal said exit.

The generally cup-shaped check valve means includes a generally cup-shaped portion having outer surface 38 and caming means 64 and 66. The cup-shaped portion may be designed in two or more heights to cover extremely small or extremely large fluid flow rates. The cup-shaped portion may include a resilient upper edge not illustrated, with or without short vertical slits 82, shown in FIG. 5. The slits 82 allow sideways movement of the upper lip to enlarge the exit area around the upper lip or perimeter 36 of the check valve means. The upper lip or perimeter 36 is moved relative to the exit area of the internal inlet bore 14 to provide the variable internal inlet exit area.

The sequencing valve housing, a portion of which is shown in FIGS. 1 and 4, encompasses the sequencing disc means 2. The sequencing valve includes a housing body 10 with an internal chamber 20. The housing body 10 includes a fluid inlet connection illustrated by numeral 12 for passing fluid to a check-valve port or internal inlet bore 14. The fluid then flows through the main cavity or housing chamber 20 and out of the valve through one or more of the outlet ports. Two outlet ports are shown at numerals 16 and 18. The internal inlet 14 is displaced from said outlet ports 16 and 18 at opposite sides of the housing chamber 20. Fluid communication is established between said inlet 12 and outlet ports 16 and 18 through the sequencing disk opening 22 in the sequencing disk means 2.

The sequencing disk means 2 is disposed in said housing chamber 20. The sequencing disk means 2 reciprocates and rotates in the housing chamber 20 by any well known method such as disclosed in the prior art. The sequencing disk means moves from the upper position shown in FIG. 1 to the lower position shown in FIG. 4 and back to the position shown in FIG. 1 with opening 22 180L from that shown to complete one cycle. The next cycle would open outlet 18, assuming sequencing valve disk 6 rotates counter clockwise as shown in FIG. 2. The sequencing disk means port 22 cooperates with the outlet ports 16 and 18 to distribute water. Additional outlets may be provided. The sequencing disk means 2 has at least a one opening 22 therethrough for fluid to pass from the housing cavity 20 into an outlet, such as shown at 16 in FIG. 4.

The stem 4 includes cam fingers 24 and 26 that cooperate with cams, not shown that are located in cam housing 28. The cams operate by any well known method such as disclosed in the prior art. The cams and cam fingers cooperate to rotate the main sealing means 6 as the sequencing disk means 2 reciprocates up and down due to the input fluid and the biasing force of spring 30. The sequencing disk means 2 is normally biased upward by spring or biasing means 30. Spring 30 engages washer 42 that is positioned under and around the end 44 of the stem 4.

Referring now to FIG. 6, the sequencing disk means 2 includes three separate components, the stem 4, the resilient main disk 6 and the generally cup-shaped check valve means 8. This is further illustrated in FIG. 5. The stem includes cam members 60 and 62 having sloping surfaces. The generally cup-shaped check valve means 8 includes mating cam means 64 and 66 having mating sloping surfaces. When the cup-shaped check valve means 8 is placed over stem 4 and cams 64 and 66 are moved downwardly past cam members 60 and 62 the cam members 64 and 66 may be brought into engagement under cam members 60 and 62. When the mating cam members are moved into a locking position, that is into engagement, the camming action drives the lower end 76 of the cup-shaped member into positive engagement with the upper surface 34 or 5 of the main disk. There is a locking notch 72 in the lower surface of the generally cup-shaped member that mates with a bulbous portion 70 on the upper surface 34 of the main disk 5. When the generally cup-shaped check valve means 8 is in its final position as shown in FIG. 7 the stem 4 and the main disk are releasably locked together and placed in a rigid or fixed position relative to one another. This prevents the main disk from shifting position relative to the longitudinal center line of the stem. This also allows cup members of various sizes to be interchangeable with a sequencing disk means in a sequencing valve.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. In a sequencing valve having an inlet portion with an inlet and having an outlet portion with at least one fluid outlet, an improved sequencing valve means comprising:
    a main sealing means in said sequencing valve means, said sealing means movably connected for sealing at least one outlet port;
    said main sealing means having a first surface for contact with said outlet portion for closing the fluid outlets, and an opposite surface;
    said main sealing means movable for allowing fluid to flow from adjacent said opposite surface to adjacent said first surface,
    a generally cup-shaped inlet closure means connected in said sequencing valve and connected to said main sealing means and positioned for movement due to inlet fluid from a generally closed position with the inlet of the sequencing valve to a position generally spaced from said inlet, said cup-shaped means having a generally cup-shaped body to temporarily hold incoming fluid from the inlet,
    said cup-shaped means having an opened port adjacent the bottom of said generally cup-shaped body to allow fluid to drain from said cup-shaped body at a particular fluid flow rate lower than the minimum operational fluid flow rate of the sequencing valve.

2. A sequencing valve means as set forth in claim 1 including,
    said main sealing means is resilient member,
    said port positioned relative to said opposite surface of said main sealing means to allow movement of said opposite surface toward said port to seal said port during a back flow condition.

3. A sequencing valve means as set forth in claim 1 including:
    a stem connected to said main sealing means,
    mating cam means connected to said stem and said cup-shaped body to releasably lock said stem, said main sealing means and said cup-shaped body together in a releasably fixed position.

4. A sequencing valve means as set forth in claim 3 including:
    said cup-shaped body is resilient,
    slits in the distal perimeter of said cup-shaped body to allow independent relative movement of the perimeter relative to said main sealing means to vary internal inlet opening in fluid sequencing valve.

5. A sequencing valve means as set forth in claim 3 including:
    an upper perimeter of said cup-shaped body sized to mate in an internal inlet port in said sequencing valve to prevent back flow.

6. A sequencing valve means as set forth in claim 1 including:
    said sequencing valve having a plurality of outlet ports,
    said main sealing means movable in a reciprocating and rotating motion for sealing different outlet ports during cycling.

7. In a sequencing valve the improvement comprising:
    a sequencing valve means, that includes
    a resilient main sealing means for the valve outlet ports, said sealing means having a first surface for sealing fluid outlets, and an opposite surface, said main sealing means including at least one outlet port through said main sealing means for allowing fluid to flow from adjacent said opposite surface through said main sealing means to an outlet port, and
    a stem connectable to said main sealing means,
    a check valve means positioned adjacent said opposite surface of said main sealing means, said check valve means symmetrically positioned adjacent the valve inlet and about said stem, said check valve means having a generally cup-shaped body of hard material to hold incoming fluid, said check valve means having an upper rim perimeter for mating with said valve inlet to check back flow of fluid into said inlet, and said check valve means having an exit port adjacent the bottom of said generally cup-shaped body to allow fluid to drain from said cup-shaped body at a particular fluid flow rate lower than the minimum fluid flow rate of the sequencing valve, and mating cam means connected to said stem and said cup-shaped body to allow replacement of said cup-shaped body.

* * * * *